United States Patent [19]
Oriel et al.

[11] 4,401,794
[45] Aug. 30, 1983

[54] MOISTURE CURING OF POLYMER COATING COMPOSITIONS CONTAINING ISOCYANATOALKYL ESTERS OF UNSATURATED CARBOXYLIC ACIDS

[75] Inventors: Sharon L. Oriel; Jimmy D. Flowers, both of Midland, Mich.

[73] Assignee: The Dow Chemical Company, Midland, Mich.

[21] Appl. No.: 312,044

[22] Filed: Oct. 16, 1981

Related U.S. Application Data

[63] Continuation-in-part of Ser. No. 181,501, Aug. 26, 1980, abandoned.

[51] Int. Cl.³ .............................................. C08F 6/26
[52] U.S. Cl. ................................. 525/328.2; 525/383; 428/500
[58] Field of Search ................... 525/383, 336, 328.2; 428/500

[56] References Cited

U.S. PATENT DOCUMENTS

| 2,718,516 | 9/1955 | Bortnick | 260/86.1 |
| 3,299,007 | 1/1967 | Suling | 260/77.5 |
| 3,453,223 | 1/1969 | Suling | 260/17 |
| 3,636,199 | 1/1972 | Joules | 264/134 |
| 3,645,924 | 2/1972 | Fogiel | 260/2.5 AC |
| 3,743,626 | 7/1973 | Emmons | 260/77.5 AQ |
| 4,024,117 | 5/1977 | Emmons | 260/307 |
| 4,173,682 | 11/1979 | Noomen | 428/423 |
| 4,222,909 | 9/1980 | Brixius et al. | 260/18 TN |

FOREIGN PATENT DOCUMENTS 1354783  5/1974  United Kingdom .

OTHER PUBLICATIONS

"Coatings from Vinyl Isocyanate Monomer", Journal of Coating Technology, pp. 82–86, Woo et al., vol. 49, #632; 9/77.

Primary Examiner—Joseph L. Schofer
Assistant Examiner—Bernard Lipman
Attorney, Agent, or Firm—Jeffrey S. Boone

[57] ABSTRACT

A polymer containing an isocyanatoalkyl ester of an unsaturated carboxylic acid and optionally, another addition polymerizable monomer, is cross-linked using water as a curing agent. Water may be mixed into the composition or transmitted to the polymer by the atmosphere. The cross-linked polymer forms a solid, insoluble coating material which is useful as an industrial coating.

12 Claims, No Drawings

MOISTURE CURING OF POLYMER COATING COMPOSITIONS CONTAINING ISOCYANATOALKYL ESTERS OF UNSATURATED CARBOXYLIC ACIDS

CROSS-REFERENCE TO RELATED APPLICATIONS

This application is a continuation-in-part of application Ser. No. 181,501, filed Aug. 26, 1980, and now abandoned.

BACKGROUND OF THE INVENTION

This invention relates to polymers which are useful as coatings. The reaction of isocyanates with organic compounds containing two or more active hydrogens such as polyamines and polyalcohols, to form polyureas and polyurethanes has been greatly studied in the prior art, and this general class of polymers has been found to possess many useful properties. Since isocyanates generally react quickly and efficiently with such compounds at room temperature, these two components usually must be mixed together only at the time and place at which reaction is desired. In an approach to making so-called "one-pot" formulations or compositions, in which the reacting materials are packaged together before using, and later activated, relatively unreactive derivates of isocyanates have been used which will regenerate the free isocyanate upon heating. Various catalysts are also often contained in these compositions to facilitate the regeneration of isocyanate. However, this heating process has several disadvantages when the isocyanate is to be used as a coating, since, for example, the size of the article to be coated or the nature of the material of the article may preclude heating to the temperature necessary for polymerization to occur. Thus, it would be extremely desirable to have polymer-forming compositions which are relatively stable on storage and which could be cured in the absence of any extensive heating and without the specific addition of other materials.

Bortnick, U.S. Pat. No. 2,718,516, is typical of the prior art teachings of the isocyanate polymerization reaction, and generally discusses the manufacture and polymerization of isocyanatoalkyl esters of acrylic acid. The polymerization taught by Bortnick requires the addition of organic compounds containing two or more active hydrogen atoms, such as polyamines, polyols, amino alcohols and polycarboxylic acids. Examples of these include ethylenediamine, diethylenetriamine, triethylenetetraamine, ethylene glycol, polyethylene glycols such as triethylene glycol, glycerol, penaerythritol, sorbitol, mannitol, oxalic acid, adipic acid, ethanolamine, diethanolamine and propanolamine. During cross-linking of the polymer, the polyols will be incorporated into the polymer cross-link structure. For example,

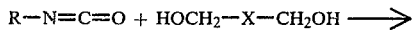

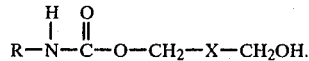

In this reaction, the polyol has been completely incorporated into the polymer. The free end of the polyol will subsequently react with another isocyanato group, completing the cross-linkage.

The prior art, however, has never successfully developed a low cost, safe and easy-to-use curing system for isocyanato esters of acrylic acids. The methods previously known require on-site mixing of potentially hazardous chemicals (e.g., Bortnick) or the use of very expensive (and potentially hazardous) chemicals (e.g., U.S. Pat. No. 3,743,626, Emmons). Additionally, many methods require heating to complete the cure. Bortnick, for example, requires heating from 60°–200° C. With the increased cost of energy, a room temperature curable compound is very desirable.

Woo and Heinert ("Journal of Coatings Technology" 49, pages 82–86, September 1977) prepared polymers containing isocyanate and cured them with water. Their findings, however, were that the samples cured with water were equivalent to those cured with polyols. They were unable to identify any significant differences between the two systems.

SUMMARY OF THE INVENTION

In one aspect, the instant invention is a method for curing an isocyanate polymer which method comprises contacting a polymer containing an isocyanatoalkyl ester of an unsaturated carboxylic acid with a quantity of water sufficient to form a substantially water- and hydrocarbon-insoluble solid.

In another aspect, this invention is the cured polymer resulting from the aforementioned method.

Surprisingly, the moisture-cured isocyanate polymers of this invention exhibit hardness and solvent resistance which are superior to similar properties of comparable urethane polymers cured with polyols.

The moisture-cured isocyanate polymers of this invention are useful as coatings in the manufacture of flooring materials, heat-sensitive substrates, fabrics, and chemical, heat and weather resistant materials.

DETAILED DESCRIPTION OF THE INVENTION

The practice of the instant invention requires a polymer containing an isocyanatoalkyl ester of an unsaturated carboxylic acid. Desirably, these esters correspond to the formula:

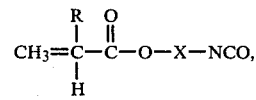

in which R is H—, CH$_3$— or CH$_3$—CH$_2$—; and X is a C$_1$ to C$_{12}$ alkyl group. More preferred are those esters wherein R is H— or CH$_3$—; and X is a C$_1$ to C$_5$ alkyl group. Most preferred are isocyanatoethyl methacrylate and isocyanatoethyl acrylate.

While the isocyanatoalkyl esters used in the instant invention may be homopolymerized, preferably, they are copolymerized with other addition polymerizable monomers. The selection of the particular comonomer or comonomers to be employed is not critical to the practice of the invention, and is generally made in accordance with the intended end use of the copolymer. Generally, suitable comonomers include alkyl esters of acrylic and methacrylic acid, such as butyl acrylate and methyl methacrylate, vinyl aromatic compounds such as styrene and vinyltoluene, conjugated dienes such as 1,3-butadiene, and other ethylenically unsaturated monomers such as acrylonitrile.

The monomers are polymerized using conventional addition polymerization techniques. The polymerization may take place in bulk or in solution.

The compositions may be used without further dilution or may be made in or diluted with compatible solvents. The solvents may be aliphatic, aromatic or solvent blends. Solvent choice will, of course, affect viscosity and cure rates. The curable compositions of this invention may vary considerably in solids content, for example, from about 10-90 weight percent solids based on the composition, preferably from about 40-80 weight percent. The molecular weight of the formulation is controlled by the percent of initiator used. The ratios of monomers are varied in accordance with the final coating properties desired, shorter chains producing a harder coating. A urethane catalyst, including dibutyltin dilaurate, triethylenediamine, stannous octoate and dibutyltin diacetate may be used in the formulation to promote a more rapid cure. The catalysts should be added in the range of 5-0.01 percent, based on coating composition, with 0.1-0.2 percent being preferred. Fillers, pigments, plasticizers, flow control agents and solvents may be employed in the formulation as appropriate.

The formulation is produced anhydrously and is protected from moisture until use. Keeping the polymer solution under $N_2$ or dried air is recommended. Water may be mixed with the composition immediately prior to use, such as by mixing in a spray nozzle, or atmospheric moisture may be utilized after application. The compositions may be applied by conventional coating methods including rolling, spraying, brushing and dipping. The substrate is chosen in accordance with the desired end use of the coating. Wood, metal, plastic, paper, tile, glass and fabric all are suitable substrates, with metal, plastic and tile being preferred, and metal being most preferred.

As mentioned above, the coatings of this invention may be cross-linked by reacting with moisture in the air at room temperature. This reaction with water leads to films having urethane, biuret, urea and allophanate linkages. The ideal conditions for cross-linking are 40-75 percent relative humidity, preferably 55-75 percent; and 0°-35° C., preferably 20°-30° C., ideally 25°-28° C. Although these conditions should not be considered as limiting, when operating outside the specified limits, problems may be encountered. Lower humidity causes a slow and/or incomplete cure while higher humidity may cause surface bubbling. Higher or lower cure temperatures may be employed if desired. Additionally, a postbake at an elevated temperature may be desired in certain applications. The surface temperature curing ability of the composition makes it ideal for heat-sensitive substrates such as semiconductors, etc.

The following examples are given to illustrate the invention. All parts and percentages are by weight unless otherwise indicated.

EXAMPLE 1

A moisture curable coating is prepared from a composition of ethyl acrylate (EA, 46.3 percent), methyl methacrylate (MMA, 46.3 percent) and 2-isocyanatoethyl methacrylate (IEM, 7.38 percent).

The synthesis of a moisture curable polymer is carried out under a dry $N_2$ purge in a 3-necked 500 ml round-bottom flask equipped with an addition funnel, condenser and stirrer. Toluene (100 g) is added to the flask. The following monomers and initiator are combined, mixed thoroughly and transferred to an addition funnel: 46.3 g EA, 46.3 g MMA, 7.38 g IEM and 0.5 g azobisisobutyronitrile. The monomers are added dropwise over ~2 hours with a 3-hour postreaction.

The reaction is checked by weighing a sample, drying it for 30 minutes at 150° C. and reweighing to determine percent solids. The weight percent NCO available for reaction with atmospheric moisture is determined by amine-HCl titration and found to be 1.99 weight percent NCO. The polymer is 44.66 percent solids with an approximate molecular weight of 20,000 based on percent initiator.

A glossy, draw-down coating on Bonderite ® 40 is made from the above product. The coating is tackfree in less than 10 minutes at 40 percent relative humidity and 23° C. The properties of the resultant coating (0.9-1.1 mils) are checked after curing at least 14 days. The composition is used to make both catalyzed and uncatalyzed coatings which are nonyellowing when exposed in a Weather-Ometer ®. Table I shows the coating properties.

EXAMPLE 2

A moisture curable polymer consisting of EA (44.5 percent), MMA (44.5 percent) and IEM (11.1 percent) was synthesized as in Example 1. The polymer was 2.92 weight percent NCO, 46.96 percent solids and had a molecular weight of ~20,000. A glossy, nonyellowing coating was made as described in Example 1. The coating properties from this process are shown in Table I.

EXAMPLE 3

A moisture curable polymer consisting of EA (45 percent), MMA (40 percent) and IEM (15 percent) was synthesized as in Example 1. The polymer was 3.96 weight percent NCO, 44.7 percent solids and had a molecular weight of ~20,000. A glossy, nonyellowing coating was made as described in Example 1. The coating properties are shown in Table I.

EXAMPLE 4

A moisture curable polymer consisting of EA (40.8 percent), MMA (40.8 percent) and IEM (18.5 percent) was synthesized as in Example 1. The polymer was 4.96 weight percent NCO, 46.96 percent solids with a molecular weight of ~20,000. A glossy, nonyellowing coating was made as described in Example 1. The coating properties from this process are shown in Table I.

EXAMPLE 5

A moisture curable polymer consisting of EA (42 percent), MMA (35 percent) and IEM (23 percent) was synthesized as in Example 1. The polymer was 6.11 weight percent NCO, 46.37 percent solids with a molecular weight of ~20,000. A glossy, nonyellowing coating was made as described in Example 1. The coating properties from this process are shown in Table I.

EXAMPLE 6

A moisture curable polymer consisting of EA (42 percent), MMA (35 percent) and IEM (23 percent) was synthesized as in Example 1 using 1.5 g of azobisisobutyronitrile. The polymer was 6.05 weight percent NCO, 45.32 percent solids with a molecular weight of ~7,000-10,000. A glossy, nonyellowing coating was made as described in Example 1. The coating properties from this process are shown in Table I.

This process can be tailored to give excellent weathering properties. Artificial weathering studies on the composition show that an increased level of IEM and the use of a catalyst aid in the maintenance of gloss. The use of a completely aliphatic composition gives a non-yellowing coating. Table I shows gloss retention data for uncatalyzed and catalyzed compositions.

TABLE I

| Example | Run Type | Formula % IEM | Formula % EA | Formula % MMA | Analysis Wt % NCO | Analysis Wt % Solids | Analysis Mol. Wt | Physical RI[2] | Physical MEK-DR[3] | Physical PH[4] | Physical AR[5] | Gloss[6] Weather[7] Initial | Gloss[6] Weather Final | Gloss[6] CCT[8] Initial | Gloss[6] CCT Final |
|---|---|---|---|---|---|---|---|---|---|---|---|---|---|---|---|
| 1 | Cat.[1] | 7.38 | 46.3 | 46.3 | 1.99 | 44.66 | 20,000 | 100 | 16 | 3H | 6.5 | 89–90 | 88–90 | 87–89 | 85–86 |
|   | Uncat. |   |   |   |   |   |   | 12 | 3 | H | 7.5 | 88–90 | 87–90 | 90–92 | 62–78 |
| 2 | Cat. | 11.1 | 44.5 | 44.5 | 2.92 | 46.96 | 20,000 | 34 | 27 | 3H | 1.8 | 90 | 90 | 90–93 | 75–90 |
|   | Uncat. |   |   |   |   |   |   | 18 | 8 | H | 5.0 | 91–93 | 92–93 | 88–92 | 45–52 |
| 3 | Cat. | 15.0 | 45 | 40 | 3.96 | 44.7 | 20,000 | 86 | 40 | 3H | — | — | — | — | — |
|   | Uncat. |   |   |   |   |   |   | 53 | 33 | H | — | 88–90 | 87–93 | 88–90 | 88–92 |
| 4 | Cat. | 18.5 | 40.8 | 40.8 | 4.96 | 46.96 | 20,000 | 70 | >100 | 3H | 2.3 | 92–94 | 92–93 | 90–99 | 78–90 |
|   | Uncat. |   |   |   |   |   |   | 24 | 6 | 3H | 3.7 | 93–94 | 94–95 | 93 | 65–70 |
| 5 | Cat. | 23 | 42 | 35 | 6.11 | 46.37 | 20,000 | 34 | >200 | 4H | — | 91–92 | 88–91 | 94–95 | 90–94 |
|   | Uncat. |   |   |   |   |   |   | 53 | 100 | 4H | — | 80–95 | 80–83 | 86–87 | 85–87 |
| 6 | Cat. | 23 | 42 | 35 | 6.05 | 45.32 | 7,000–10,000 | 40 | >100 | 3H | — | — | — | — | — |
|   | Uncat. |   |   |   |   |   |   | 58 | 91 | 3H | — | — | — | — | — |

[1]0.1 weight percent dibutyltin diacetate.
[2]Reverse impact, minimum inch-pounds causing failure.
[3]Methyl ethyl ketone double rubs to failure with 32 oz gauze-covered hammer.
[4]Pencil hardness of lead which will just not penetrate film.
[5]Abrasion resistance, mg lost after 100 cycles with CS-17 wheel and 1000 g weight.
[6]60° C. gloss.
[7]Weather-Ometer®—1,000 hours exposure to 102 minutes of xenon lamp and 18 minutes exposure to lamp and distilled water spray.
[8]Cleveland Condensation Cabinet—1,000 hours exposure to 100% humidity and 100° F.

Table II summarizes some unexpected and desirable properties of the IEM copolymer cross-linked by water rather than a polyol.

TABLE II

| Cross-linking Agent[1] | RI | MEK-DR | pH | Adhesion Loss % |
|---|---|---|---|---|
| Water[2] | 22 | >200 | 4H | 12.5 |
| 1,4-butane diol | 54 | 15 | 3H | 35.0 |

[1]Terpolymer: EA (42 percent), MMA (35 percent), IEM (23 percent); 21 days at ambient conditions.
[2]Unprimed, unpigmented coating; 21 days at ambient conditions.

What is claimed is:

1. A method of curing a polymer containing an isocyanatoalkyl ester of an unsaturated carboxylic acid, comprising contacting the polymer with a sufficient amount of water to substantially cross-link the isocyanate groups.

2. The method of claim 1 wherein the isocyanatoalkyl ester is 2-isocyanatoethyl methacrylate or 2-isocyanatoethyl acrylate.

3. The method of claim 1 wherein the polymer also contains another addition polymerizable monomer.

4. The method of claim 3 wherein the other addition polymerizable monomer is selected from the group consisting of butyl acrylate, ethyl acrylate, methyl methacrylate, styrene, butadiene, vinyltoluene and acrylonitrile.

5. The cross-linked polymer formed by the method of claim 1, 2, 3 or 4.

6. A substrate coated with the polymer of claim 5.

7. A method of curing a polymer containing an isocyanatoalkyl ester of an unsaturated carboxylic acid, comprising exposing the polymer to a moisture-containing atmosphere for a time sufficient to substantially cross-link the polymer.

8. The method of claim 7 wherein the isocyanatoalkyl ester is 2-isocyanatoethyl methacrylate or 2-isocyanatoethyl acrylate.

9. The method of claim 8 wherein the polymer also contains another addition polymerizable monomer.

10. The method of claim 9 wherein the other addition polymerizable monomer is selected from the group consisting of butyl acrylate, ethyl acrylate, methyl methacrylate, styrene, butadiene, vinyltoluene and acrylonitrile.

11. The method of claim 7, 8, 9 or 10 wherein the atmosphere has a 40 to 75 percent relative humidity.

12. The method of claim 11 wherein the atmosphere has a temperature of 0° to 35° C.

* * * * *

UNITED STATES PATENT AND TRADEMARK OFFICE
CERTIFICATE OF CORRECTION

PATENT NO. : 4,401,794
DATED : August 30, 1983
INVENTOR(S) : Sharon L. Oriel; Jimmy D. Flowers It is certified that error appears in the above—identified patent and that said Letters Patent is hereby corrected as shown below:

Col. 1, line 54: Please delete "penaerythritol" and insert --pentaerythritol--.
Claim 1, line 45: Please delete "containing" and insert --polymerized from--.
Claim 7, line 33: Please delete "containing" and insert --polymerized from--.

Signed and Sealed this

Twenty-eighth Day of February 1984

[SEAL]

Attest:

GERALD J. MOSSINGHOFF

Attesting Officer

Commissioner of Patents and Trademarks